Nov. 23, 1926.  W. M. CUTLER  1,608,462
CHUCK
Filed July 8, 1921   2 Sheets-Sheet 1
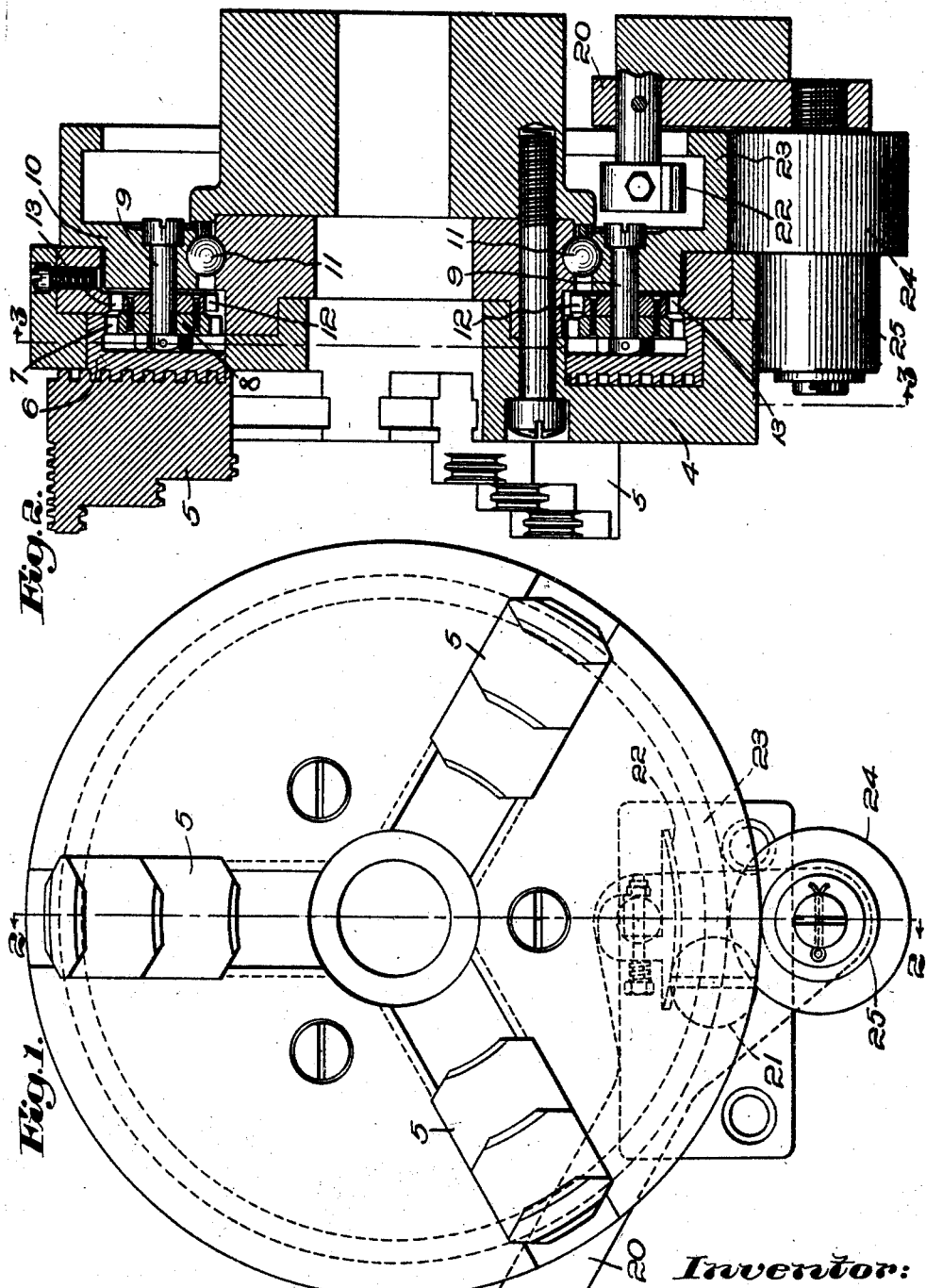
Inventor:
Wallace M. Cutler
By Emery Booth Janney & Varney
Attys.

Nov. 23, 1926.

W. M. CUTLER 1,608,462

CHUCK

Filed July 8, 1921 2 Sheets-Sheet 2

Inventor
Wallace M. Cutler.
by Emery Booth Janney + Varney
Attys.

Patented Nov. 23, 1926.

1,608,462

UNITED STATES PATENT OFFICE.

WALLACE M. CUTLER, OF WINDSOR LOCKS, CONNECTICUT, ASSIGNOR TO THE E. HORTON & SON COMPANY, OF WINDSOR LOCKS, CONNECTICUT, A CORPORATION OF CONNECTICUT.

CHUCK.

Application filed July 8, 1921. Serial No. 483,258.

This invention pertains to improvements in chucks, and more particularly, though not exclusively, to improvements in chucks of a type adapted to grip and release the work either while the chuck body is rotating or at rest. It is among the objects of the invention to provide a superior chuck of simple and efficient construction.

In the drawings, which show a preferred form of one embodiment of my invention:—

Figure 1 is a front elevation of a preferred form of chuck;

Fig. 2 is a section on the line 2—2 of Fig. 1, being partly in elevation; and

Figure 3:
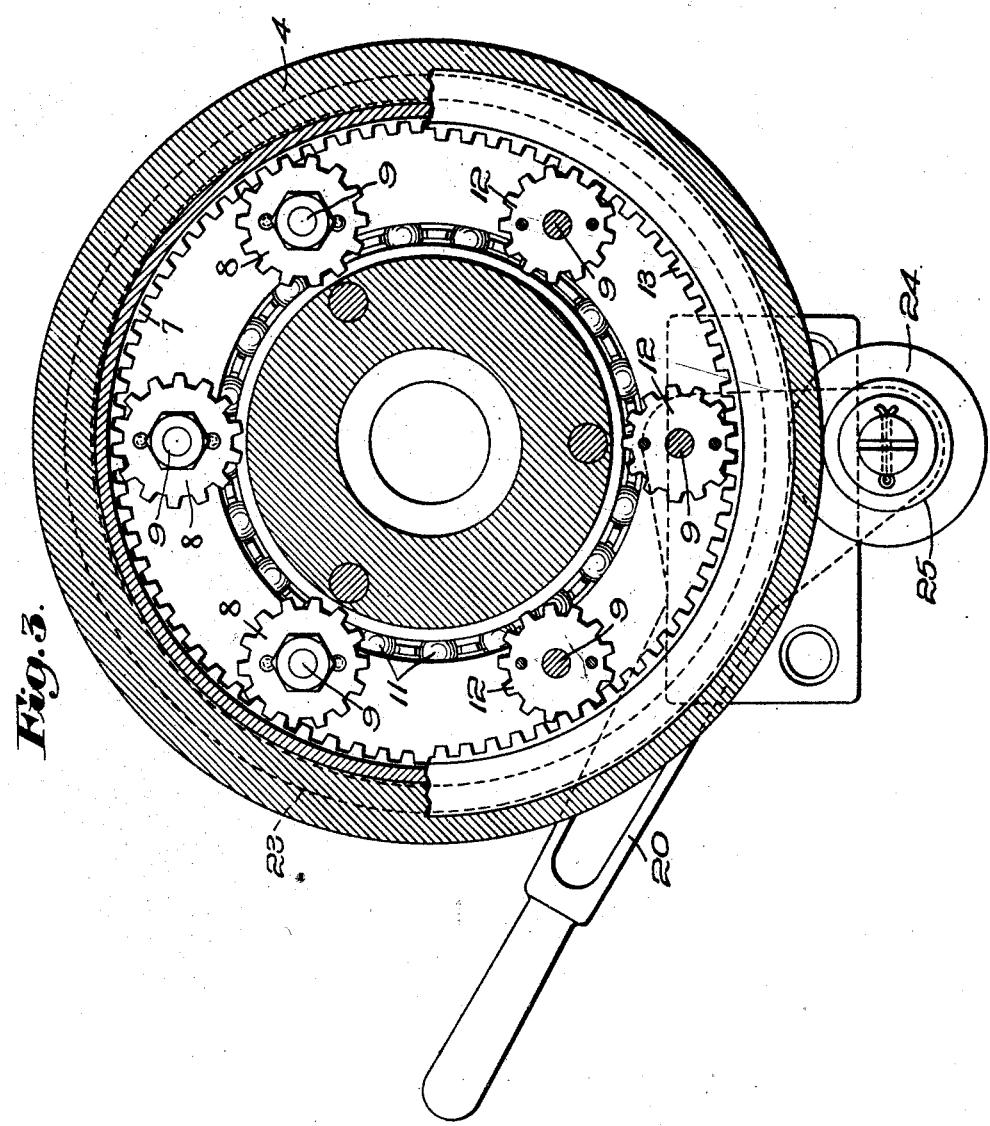
Fig. 3 is a section on the line 3—3 of Fig. 2, being partly in elevation.

Referring to the drawings and to the preferred form of my invention selected for illustrative purposes, I have shown a chuck including a body 4 providing a plurality of radial slots in which are mounted chuck jaws 5 which, in the preferred form of my invention illustrated, may be actuated toward and from the axis of the chuck by the scroll 6. The scroll 6 is illustrative of one of several forms of mechanism by rotation or oscillation of which the chuck jaws may be actuated toward and from the work. The present invention relates more particularly to improved mechanism for actuating rotation or oscillation of the chuck jaw-operating mechanism typified by the scroll 6. In the preferred form of my invention illustrated, the jaw-operating mechanism 6 is adapted to be rotated or oscillated by differential gearing which preferably includes, as illustrated, the internal gear 7 secured to or carried by the jaw-operating part 6, the differential pinions 8, which may be as illustrated six in number, meshing with said internal gear 7 and rotatable on studs or journals 9 carried by the plate or disc 10 rotatably mounted on the body of the chuck so that it may be rotated or oscillated about the axis of the chuck body. In the preferred form of my invention illustrated, I have provided, with a view to reducing friction, ball bearings 11 between the ring or plate 10 and the chuck body. On the studs or journals 9 and secured to the pinions 8, I have provided pinions 12, also six in number and of different size from the pinions 8, and meshing with the internal gear 13 secured to and rotatable with the chuck body. The gears and pinions constituting the differential interposed between the chuck body and the jaw-actuating part, typified by the scroll 6, may be of any suitable pitch, but the ratio between the pinions 8 and the gear 7 as compared with the ratio between the pinions 12 and the gear 13 should be such that if relative movement about the axis of the chuck takes place between the chuck body and the plate or disc 10 carrying the studs or journals 9 and the pinions 12 and 8, the pinions 12 and 8 will cooperate to rotate the chuck jaw-operating part 6 relative to the chuck body. Thus, when the chuck body is not rotating about its axis, if the plate or disc 10 be rotated about the axis of the chuck body the pinion 12 will be rotated by reason of its engagement with the internal gear 13 carried by the chuck body. The pinion 8 being secured to the pinion 12 will rotate at the same speed as the pinion 12, and will in turn effect a relatively slow rotation of the gear 7 meshing therewith and of the jaw-actuating part 6 secured to the gear 7. By varying the proportions of the differential gears, any suitable speed reduction between the disc 10 and the chuck jaw-actuating part 6 may be effected. I prefer, as shown, that there shall be a relatively small degree of differential action so that there may be a very considerable increase in torque exerted on the jaw-actuating part 6 as compared with that applied to the disc or plate 10.

When the chuck body is not rotating with the lathe spindle, the jaws will be actuated to and from the work by rotary movement of the plate or disc 10 in the appropriate direction. When the chuck as a whole is rotating with the lathe spindle, retardation of the plate or disc 10 (while the chuck body continues to rotate with the lathe spindle) will produce relative rotary movement between the chuck body and the plate or disc 10 to actuate the jaws in one direction. To actuate the jaws in the other direction, I preferably provide suitable means for accelerating the rate of rotation of the plate or disc 10 relative to the chuck body.

In the preferred form of my invention illustrated, I have combined the means for retarding the plate or disc 10 and for accelerating the same providing a lever 20 fulcrumed at 21 and providing a friction brake 22 which may, as illustrated, be brought in contact with the inner surface of the flange 23 connected to and forming a part of the plate or disc 10. A downward pressure on the lever 20, as viewed in Figs. 1 and 3, will apply retarding or braking pressure to the flange 23. To accelerate rotation of the flange 23 and therefore of the plate or disc 10 relative to the chuck body, I may provide, as illustrated, friction discs 24 and 25 of different diameters, the friction disc 25 being of smaller diameter and bearing against the outer peripheral wall of the chuck body while the friction disc 24, of larger diameter than the disc 25, bears against the outer wall of the flange 23 carried by the plate or disc 10. These friction discs 24 and 25 may be carried by the lever 20, which also carries the friction brake. Where, as illustrated, this form of accelerating means is utilized, the chuck body is larger in external diameter than the external diameter of the flange 23. Therefore, assuming the lever 20 be raised, as viewed in Figs. 1 and 3, the friction disc 25 will be rotated by contact with the peripheral wall of the chuck body at a rate determined by the rate of rotation of the chuck body, disregarding slippage. The friction disc 24 is so constructed as to rotate at the same speed as the friction disc 25, either by being directly secured thereto or by being keyed to the same shaft. The peripheral portion of the friction disc 24 will, therefore, be moving at a speed somewhat greater than that at which the peripheral portion of the flange 23 normally moves while rotating at the same speed as the chuck body. The friction between the disc 24 and the exterior surface of the flange 23 will therefore accelerate rotation of the flange 23 in the same direction as that in which the chuck body is rotating so that relative movement will take place between the plate or disc 10 and the chuck body, thereby effecting jaw-operating movement of the jaw-operating part 6. Any suitable friction surfacing may if desired be provided between the friction discs 24 and 25 and the cooperating peripheral portions of the chuck.

I will now describe the operation of the chuck while at speed. Assuming the chuck jaws 5 to be used for external chucking and to be engaged with the work, the operator, to withdraw the jaws from the work without stopping rotation of the lathe spindle, pulls upwardly on the lever 20, thus drawing the friction discs 24 and 25 into contact respectively with the peripheral portions of the flange 23 and of the chuck body 4. This rotates the friction discs 24 and 25 in a direction contrary to that in which the chuck body is rotating, the tendency being for the friction disc 25 to be rotated somewhat faster than the friction disc 24. The two friction discs are, however, not rotatable relative to each other and therefore the friction disc 24 will be rotated at the same speed as the friction disc 25 and will therefore tend to rotate the flange 23 at a speed somewhat greater than that at which the chuck as a whole is rotating. This acceleration of movement of the flange 23 will accelerate the plate or disc 10. As the plate or disc 10 rotates relative to the chuck body, it carries with it the pinions 8 and 12. The rate of rotation of the pinions 12 about their axes will be determined by the internal gear 13, since the latter is secured to the chuck body and its rate of rotation is determined by the rate of rotation of the spindle carrying the chuck and cannot be varied by the differential mechanism. The pinions 8 are secured to and rotate at the same speed as the pinions 12, and the chuck jaw-actuating part 6 carrying the internal gear 7 will therefore be rotated relative to the chuck body through at least a portion of a revolution by reason of the fact that the ratios between the pinions 12 and the gear 13 differ from the ratios between the pinions 8 and the gear 7. This rotation or partial rotation of the jaw-operating part 6 relative to the chuck body will actuate the jaws toward or from the work through whatever form of interposed mechanism is used, the scroll illustrated being perhaps the medium preferable for most purposes. When the jaws 5 have released the work, the new work may be inserted between the jaws without stopping the spindle, and a downward pressure on the lever 20 will cause the brake 22 to bear against the inner surface of the flange 23, thereby retarding the plate or disc 10 and causing the pinions 8 and 12 to revolve on their axes at a rate determined by the ratio between the pinions 12 and the cooperating gear 13. The pinions 8, rotating at the same speed as the pinions 12, will in turn cause the gear 7 and chuck jaw-actuating part 6 to be rotated at least through a portion of a revolution relative to the chuck body in a direction opposite to that before described in connection with release of the work by the chuck jaws, thus causing the chuck jaws to move toward and engage the work.

It will be obvious that the proportions and construction of the gears constituting the differential mechanism may be greatly varied, that any suitable jaw-actuating mechanism may be substituted for the scroll, and generally that while I have shown and described a preferred form of one embodiment of my invention, it will be understood that major changes involving omission, substitution, alteration and reversal of parts, and even changes in the mode of operation, may be made without departing from the scope of my invention, which is best defined in the following claims.

Claims:

1. A chuck comprising in combination, a body fixed relative to the spindle carrying the chuck, said body presenting guides carrying reciprocable jaws non-rotatable relative to said body and spindle, and jaw-operating means including differential gears cooperating with differential pinions, said differential pinions mounted eccentrically with respect to the chuck-carrying spindle and rotatable relative thereto in either direction about the axis of the chuck to effect work-gripping and releasing movement of the jaws; said gears and pinions normally stationary relative to each other when the chuck is rotating and the jaws are stationary relative to the chuck body.

2. In a chuck for a lathe spindle, the combination of a body rigidly secured to and rotating with said spindle, a jaw carried by said body in non-rotatable relation to said body and spindle, a jaw-operating part oscillatable about the axis of the chuck, and a gear carried by said part, a second gear carried independently of said jaw-operating part, said gears being concentric with the chuck, a pinion meshing with said first-named gear, a second pinion meshing with said second-named gear, said gears and their cooperating pinions presenting different gear ratios, said gears and pinions being normally stationary relative to each other when the chuck is rotating and the jaws are stationary relative to the chuck body, and means permitting bodily oscillation of the axes of said pinions relative to the chuck body to effect movement of said jaw-operating part relative to said chuck by differential action of said gears and pinions.

3. In a chuck for a lathe spindle, the combination of a body rigidly secured to and rotating with said spindle, jaws carried by said body in non-rotatable relation to said body and spindle, a jaw-operating part oscillatable about the axis of the chuck, and an internal gear carried by said part, a second internal gear carried independently of said jaw-operating part, a pinion meshing with said first-named gear, a second pinion meshing with said second-named gear, said gears and their cooperating pinions presenting different gear ratios, said gears and pinions being normally stationary relative to each other when the chuck is rotating and the jaws are stationary relative to the chuck body, and means permitting bodily oscillation of said pinions relative to the chuck body to effect movement of said jaw-operating part relative to said chuck by differential action of said gears and pinions.

4. In a chuck for a lathe spindle, the combination of a body rigidly secured to and rotating with said spindle, jaws mounted for reciprocation on said body in non-rotatable relation to said body and spindle, jaw-operating means, and gearing for turning said jaw-operating means relative to the chuck body; said gearing including a pinion-carrying part mounted for turning movement relative to the chuck body and the lathe spindle, and differential gearing between said part and said jaw-operating means; said pinion-carrying part being arranged to effect work-gripping and releasing movement of the jaws, and said differential gearing comprising permanently meshing gears normally stationary relative to each other when the chuck is rotating and said jaws are stationary relative to the chuck body.

5. A chuck for a lathe spindle comprising, in combination, a body rigidly secured to the lathe spindle, a movable jaw mounted in non-rotatable relation to said body, jaw-operating mechanism including a part mounted for turning movement relative to said body, and means including a member mounted for rotation relative to said body and having a reduction gear connection with said part providing for acceleration or retardation of the rate of rotation of said part to produce turning movement of said part relative to said body in opposite directions.

6. A chuck comprising, in combination, a body, jaw-operating mechanism including a part mounted for turning movement relative to said body, and means providing for acceleration or retardation of the rate of rotation of said part to produce turning movement of said part relative to said body in opposite directions, said part and body presenting peripheral portions of different diameters and said means effecting acceleration including friction rolls of different diameters and means for pressing said rolls against said peripheral portions, whereby rotation of one of said portions may produce relative rotation of the other.

7. A chuck comprising, in combination, jaw-operating means including differential mechanism for rotating a jaw-moving part and a second differential mechanism for accelerating rotation of a portion of said first-named differential mechanism in the same sense of rotation as that in which the chuck is rotating.

8. A chuck comprising, in combination, a chuck body carrying movable jaws, a jaw-operating part mounted for turning movement in opposite directions relative to said chuck body, differential gearing for actuating said jaw-operating part including a pair of relatively rotatable gears concentric with the chuck spindle and a pair of differential pinions meshing with said gears mounted to rotate relative to said chuck body, the jaw-operating part and said gears, and means carrying said pinions presenting a portion projecting from the rear face of said chuck body and arranged to be operated by mechanism for alternatively producing rotation of said pinions relative to the chuck body and said gears in opposite directions relative to the chuck body.

9. A lathe chuck comprising, in combination, a chuck body rigidly secured to the lathe spindle and carrying radially movable jaws, a jaw-operating part mounted for rotation relative to the chuck body, differential gearing for actuating said jaw-operating part including a pair of gears concentric with the lathe spindle, one operatively connected to the chuck body and the other secured to the jaw-operating part and a pair of differential pinions eccentrically mounted with respect to the lathe spindle and meshing with said gears, a pinion-carrying part rotatable about the lathe spindle in either direction relative to the chuck body, and means on said pinion-carrying part projecting from the rear face of the chuck arranged to be operated by mechanism whereby to produce relative movement of the pinions with respect to the chuck body in either direction to actuate said jaw-operating part.

10. A lathe chuck comprising, in combination, a chuck body carrying movable jaws fixed to rotate with the lathe spindle, operating mechanism for said jaws, differential gearing for actuating said operating mechanism, said gearing including a pair of pinions mounted on an axis rotatable with respect to the spindle, a pair of gears cooperating with said pinions, and a pinion-carrying part, and mechanical means cooperating with said pinion-carrying part to actuate said pinions alternatively in either direction.

11. A lathe chuck comprising, in combination a chuck body carrying movable jaws, a jaw-operating part rotatable relative to said body in either direction to open and close said jaws, differential gearing for actuating said jaw-operating part; said gearing including an internal gear operatively connected to the jaw operating part, a second internal gear concentric with said first gear and operatively connected to the chuck body and a pair of pinions operatively secured together, meshing with said internal gears and rotatable about the lathe spindle relative to said internal gears; and a pinion carrier presenting a flange projecting rearwardly of the chuck whereby to cooperate with mechanism to produce the rotation of said spindle carrier in either direction relative to the chuck body.

12. A lathe chuck comprising, in combination, a chuck body having slidable jaws, jaw-operating means rotatable with respect to said jaws, a pair of annular gears, one on the jaw-operating means and the other operatively connected to the chuck body, differential pinions engaging the annular gears, and a rotatable pinion carrier mounted at one end of the chuck body and exposed for manipulation to control the motion of the chuck jaws, said gears and pinions operatively interposed between the chuck body and the pinion carrier.

13. A lathe chuck comprising, in combination, a chuck body having slidable jaws, jaw-operating means rotatable with respect to said jaws, a pair of annular gears, one on the jaw-operating means and the other operatively connected to the chuck body, differential pinions engaging the annular gears, a rotatable pinion carrier mounted at one end of the chuck body and exposed for manipulation to control the motion of the chuck jaws, said gears and pinions operatively interposed between the chuck body and the pinion carrier, and means for alternately retarding or accelerating the rotation of the pinion carrier during the rotation of the chuck body.

14. A chuck for a lathe spindle having in combination, a body carried by said spindle in non-rotatable relation thereto, said body having on its forward face radially disposed slots, jaws slidably mounted in said slots, a rearwardly opening recess in said body intersecting said slots, a scroll wheel in said recess having a scroll cam meshing with rack teeth carried by the bases of said jaws, internal gear teeth carried by said scroll wheel, a ring mounted rearwardly of said scroll wheel and retaining it in said recess, internal gear teeth carried by said ring, a differential pinion carrier mounted for rotation on said body and closing said recess receiving said scroll wheel, said pinion carrier being stationary relatively to said body when said jaws are stationary relatively to said body, forwardly projecting studs on said pinion carrier, differential pinions rotatably mounted on said studs and meshing with said internal gear teeth on said scroll wheel and ring, and said internal gear teeth and pinions presenting two sets of gears of different ratio, whereby rotation of said pinion carrier in either of opposite directions relatively to said body will effect corresponding rotation of said scroll wheel at materially reduced speed for moving said jaws.

15. A chuck for a lathe spindle having in combination, a body carried by said lathe spindle in non-rotatable relation thereto work gripping jaws, means movably connecting said jaws and said body in non-rotable relation, a member mounted on said body behind said jaws for oscillatory movement, a scroll connection between said member and jaws, said member on its rearward side carrying an annular series of gear teeth, an annular series of gear teeth carried by said body rearwardly of said member, an annular member mounted on said body for oscillatory movement, forwardly projecting studs on said annular member, pinions on said stubs, and said pinions meshing with both annular series of gear teeth and forming therewith two sets of gears of different ratio, said annular member being stationary relatively to said body when said jaws are stationary relatively to said body.

16. A chuck for a lathe spindle having in combination, a body carried by said spindle in a non-rotatable relation thereto, said body having on its forward face radially disposed slots, jaws slidably mounted in said slots, a rearwardly opening recess in said body intersecting said slots, a scroll wheel in said recess having a scroll cam meshing with rack teeth carried by the bases of said jaws, internal gear teeth carried by said scroll wheel, a ring mounted rearwardly of said scroll wheel, internal gear teeth carried by said ring, a differential pinion carrier mounted for rotation on said body, said pinion carrier being stationary relatively to said body when said jaws are stationary relatively to said body, forwardly projecting studs on said pinion carrier, differential pinions rotably mounted on said studs and meshing with said internal gear teeth on said scroll wheel and ring, and said internal gear teeth and pinions presenting two sets of gears of different ratio, whereby rotation of said pinion carrier in either of opposite directions relatively to said body will effect corresponding rotation of said scroll wheel at materially reduced speed for moving said jaws.

17. A chuck having in combination, work gripping means, operator controlled means actuated by rotation of said chuck for moving said work gripping means transversely to the axis of rotation of said chuck without rotating said work gripping means relatively to the spindle of said chuck, and said means including differential gearing stationary relatively to said chuck when said jaws are stationary relatively to said chuck.

In testimony whereof I have signed my name to this specification.

WALLACE M. CUTLER.